United States Patent
Nakamura et al.

(10) Patent No.: US 8,553,105 B2
(45) Date of Patent: Oct. 8, 2013

(54) AUDIOVISUAL DATA RECORDING DEVICE AND METHOD

(75) Inventors: Satoshi Nakamura, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 515 days.

(21) Appl. No.: 12/870,172

(22) Filed: Aug. 27, 2010

(65) Prior Publication Data

US 2011/0050944 A1 Mar. 3, 2011

(30) Foreign Application Priority Data

Aug. 28, 2009 (JP) ................. 2009-198881

(51) Int. Cl.
*H04N 5/76* (2006.01)
*H04N 15/00* (2006.01)
*H04N 13/00* (2006.01)
*G03B 17/24* (2006.01)

(52) U.S. Cl.
USPC ........................ 348/231.4; 348/42; 396/312

(58) Field of Classification Search
USPC .................. 348/42–60; 396/312; 352/1–37
See application file for complete search history.

(56) References Cited

U.S. PATENT DOCUMENTS

| | | | | |
|---|---|---|---|---|
| 5,677,728 A | * | 10/1997 | Schoolman | 348/14.15 |
| 6,243,683 B1 | * | 6/2001 | Peters | 704/273 |
| 6,618,073 B1 | * | 9/2003 | Lambert et al. | 348/14.08 |
| 6,714,238 B2 | | 3/2004 | Urisaka et al. | |
| 2002/0057347 A1 | | 5/2002 | Urisaka et al. | |
| 2003/0067536 A1 | * | 4/2003 | Boulanger et al. | 348/14.08 |
| 2007/0126863 A1 | * | 6/2007 | Prechtl et al. | 348/43 |
| 2007/0189551 A1 | * | 8/2007 | Kimijima | 381/97 |
| 2010/0247088 A1 | * | 9/2010 | Campbell et al. | 396/325 |
| 2010/0328423 A1 | * | 12/2010 | Etter | 348/14.16 |

FOREIGN PATENT DOCUMENTS

| | | |
|---|---|---|
| JP | 6-105400 A | 4/1994 |
| JP | 2006-128818 A | 5/2006 |
| JP | 2006-345246 A | 12/2006 |

* cited by examiner

*Primary Examiner* — Sinh Tran
*Assistant Examiner* — Christopher K Peterson
(74) *Attorney, Agent, or Firm* — Birch, Stewart, Kolasch & Birch, LLP

(57) ABSTRACT

In each of photographed L and R viewpoint images, an object area and an object size are detected. A disparity calculator calculates a maximum disparity of the object area between the L and R viewpoint images. A sound image locating unit determines the shift amount of a reverberation sound ratio from a standard ratio based on the object size and the maximum disparity, to give an appropriate depth to sound data. The sound image locating unit also locates the sound data with an appropriate location angle in accordance with the position of a horizontal center of the object area. The processed sound data and L and R viewpoint image data are compressed, and recorded as an AV file on a memory card.

10 Claims, 15 Drawing Sheets

SHIFT AMOUNT DETERMINATION TABLE

|  | LENS SHIFT AMOUNT < TH VALUE | LENS SHIFT AMOUNT ≥ TH VALUE |
|---|---|---|
| OBJECT SIZE ≥ THRESHOLD VALUE | −5% | 0% |
| OBJECT SIZE < THRESHOLD VALUE | 0% | 0% |

THIRD AUDIOVISUAL FILE

FIG. 15

SHIFT AMOUNT DETERMINATION TABLE

|  | MAXIMUM DISPARITY<1ST TH VALUE | 1ST TH VALUE≦MAXIMUM DISPARITY<2ND TH VALUE | 2ND TH VALUE≦MAXIMUM DISPARITY |
|---|---|---|---|
| WIDE-ANGLE POSITION | 0% | −5% | −10% |
| STANDARD POSITION | 0% | −2% | −5% |
| TELEPHOTO POSITION | 0% | 0% | −5% |

AUDIOVISUAL DATA RECORDING DEVICE AND METHOD

BACKGROUND OF THE INVENTION

1. Field of the Invention

The present invention relates to an audiovisual (AV) data recording device and method for recording both of a stereo motion image and a sound.

2. Description Related to the Prior Art

A digital video camera (camcorder) for recording audiovisual (AV) data is widely used, and there are various types of digital video cameras developed from commercial use to home use. The digital video camera is provided with an imaging unit and a microphone, and records motion image data captured by the imaging unit and sound data converted by the microphone together on a recording medium.

According to U.S. Patent Application Publication No. 2002/057347 and U.S. Pat. No. 6,714,238, the directionality of the microphone, including spreading, direction, and sensitivity, is controlled in response to panning, tilting, and zooming operation of the digital video camera. Upon zooming in on a main object with a narrow angle of view, for example, the directionality of the microphone is narrowed therewith, and only sound or voice from the main object is captured to add a sense of realism.

In reproduction of the AV data, the sound is outputted from two speakers disposed side-to-side. A viewer listens to a composite sound, and perceives where the composite sound comes from, in other words, where a sound image being a virtual sound source is located. The position of the sound image perceived by the viewer is referred to as a sound image location. The sound image is located by varying volume levels of the sound outputted from the left and right speakers, for example. If the sound is outputted at the same volume level from both of the speakers, for example, the sound image is located in the middle of the two speakers. If the sound is outputted only from the left speaker, the sound image is located near the left speaker. If the sound is outputted only from the right speaker, the sound image is located near the right speaker. When a reference line denotes a line that connects the viewer to the midpoint of the two speakers, a location angle refers to an angle that a line connecting the viewer to the located sound image forms with the reference line.

The sound that is outputted from the speakers and reaches the viewer is composed of a reverberation sound and a direct sound. The reverberation sound reaches the viewer after reverberation against surrounding walls and the like, while the direct sound directly reaches the viewer. If the ratio of the reverberation sound to the direct sound is high, the sound image is located on a back side, and the viewer perceives as if the sound emerged from a distant sound source. If the ratio of the reverberation sound to the direct sound is low, on the other hand, the sound image is located on a front side, and the viewer perceives as if the sound emerged from a near sound source. Thus, increasing the ratio of the reverberation sound or lowering the volume level of the output sound locates the sound image on the back side, while decreasing the ratio of the reverberation sound or raising the volume level of the output sound locates the sound image on the front side.

In an audio signal processing apparatus of U.S. Patent Application Publication No. 2007/0189551, when zooming in to telephoto on three persons out of five persons, the location angle of the sound image of each object person is changed. Only sounds or voices from the three object persons are recorded, while sounds or voices from the excluded two persons are not recorded. This allows increase in a sense of togetherness between a motion image and the sounds in reproduction. The sound image of the object person positioned in the middle of the image is located in the middle of the left and right speakers. The sound image of the object person positioned at the left of the image is located near the left speaker, and the sound image of the object person positioned at the right of the image is located near the right speaker.

In a three-dimensional space reproduction system according to Japanese Patent Laid-Open Publication No. 6-105400, a stereo image is produced from two images having disparity, that is, an L viewpoint image seen by a viewer's left eye and an R viewpoint image seen by a viewer's right eye. Output of the sound data is controlled in accordance with the depth of the stereo image. In the stereo image, the amount of disparity becomes a maximum at a point that looks nearest to the viewer, and the amount of disparity becomes a minimum at a point that looks farthest from the viewer. If the difference between the maximum disparity and the minimum disparity is small, the stereo image has a shallow depth. In this case, the sound image is located on the front side by reducing the ratio of the reverberation sound to the direct sound, and the depth of the sound is shallowed to increase a sense of realism in a scene. If the difference between the maximum disparity and the minimum disparity is large, the stereo image has a deep depth. Thus, the ratio of the reverberation sound is increased to locate the sound image on the rear side and deepen the depth of the sound.

According to the U.S. Patent Application Publication No. 2002/057347, the U.S. Pat. No. 6,714,238, and the U.S. Patent Application Publication No. 2007/0189551, the obtained sound data is processed in response to variation of the image size of the main object with the panning, tilting, and zooming operation of the digital video camera, in order to increase the senses of realism and togetherness between the motion image and the sound. The sound data, however, is not processed, when the main object itself gets near to or goes away from the digital video camera without the panning, tilting, and zooming operation.

According to the Japanese Patent Laid-Open Publication No. 6-105400, the depth of the sound depends on the difference between the maximum disparity and the minimum disparity. Thus, even if the image size of the main object is large, when the difference between the maximum disparity and the minimum disparity is large and the stereo image has the deep depth, the sound also has the deep depth. This causes a lack of a sense of realism.

SUMMARY OF THE INVENTION

An object of the present invention is to provide an audiovisual data recording device that locates a sound image in accordance with the image size of a main object.

An audiovisual data recording device according to the present invention includes a plurality of imaging units, a plurality of microphones, an object area detector, an information obtaining section, a determining section, and a recorder. The plurality of imaging units capture one set of viewpoint images for composing a stereo motion image at a predetermined time interval. Each imaging unit has an imaging optical system and an image sensor. The plurality of microphones capture raw sound data during the capture of the viewpoint images. The object area detector detects a main object area in each viewpoint image. The information obtaining section obtains at least one of disparity information, zoom magnification information of an imaging optical system, and focus adjustment information of the imaging optical system, whenever the one set of viewpoint images is captured. The determining section determines where to locate a sound image as sound image location information, based on the main object area detected by the object area detector and one of the disparity information, the zoom magnification information, and the focus adjustment information obtained by the information obtaining section. The recorder records on a recording medium the raw sound data and the sound image location information, or processed sound data with the located sound image, together with data of the viewpoint images.

The one set of viewpoint images may include a left viewpoint image and a right viewpoint image. The plurality of imaging units may include a left imaging unit for capturing the left viewpoint image and a right imaging unit for capturing the right viewpoint image. The plurality of microphones may include a left microphone related to the left imaging unit and a right microphone related to the right imaging unit.

The disparity information may include at least one of a maximum disparity or an average disparity in the one set of viewpoint images and a maximum disparity or an average disparity in the main object.

If the processed sound data is recorded on the recording medium, it is preferable that the audiovisual data recording device further include a sound image locating unit. The sound image locating unit converts the raw sound data captured by the microphones into the processed sound data based on the sound image location information.

It is preferable that the sound image locating unit locate the sound image in a depth direction by varying a ratio between a direct sound and a reverberation sound, and locate the sound image in a horizontal direction by a convolution operation with a head-related transfer function.

The audiovisual data recording device may further include a display for displaying the stereo motion image, and a speaker for converting the processed sound data into the sound.

The determining section may determine where to locate the sound image in accordance with a position and a size of the main object area and a position of a focus lens in each imaging optical system. Otherwise, the determining section determines where to locate the sound image in accordance with a position and a size of the main object area and a zoom magnification of each imaging optical system.

A method for recording an audiovisual data includes the steps of capturing by a plurality of imaging units one set of viewpoint images for composing a stereo motion image at a predetermined time interval, capturing by a plurality of microphones raw sound data during the capture of the viewpoint images, detecting a main object area in each viewpoint image, obtaining at least one of disparity information, zoom magnification information of an imaging optical system, and focus adjustment information of the imaging optical system, whenever the one set of viewpoint images is captured, determining where to locate a sound image as sound image location information based on the main object area and one of the disparity information, the zoom magnification information, and the focus adjustment information, and recording on a recording medium the raw sound data and the sound image location information, or processed sound data with the located sound image together with data of the viewpoint images.

According to the audiovisual data recording device of the present invention, the sound image is located in accordance with the position and size of the object area detected in the left and right viewpoint images, and the disparity between the left and right viewpoint images. In reproduction, the stereo motion image and the sound that has the sound image located in accordance with the stereo motion image are outputted. Thus, the sound can enhance a sense of realism and an impact of the scene.

BRIEF DESCRIPTION OF THE DRAWINGS

For more complete understanding of the present invention, and the advantage thereof, reference is now made to the following descriptions taken in conjunction with the accompanying drawings, in which:

FIG. 15 is a shift amount determination table according to a third embodiment for determining the shift amount of the reverberation sound ratio based on the angle of view.

DESCRIPTION OF THE PREFERRED EMBODIMENTS

First Embodiment

Figure 1:
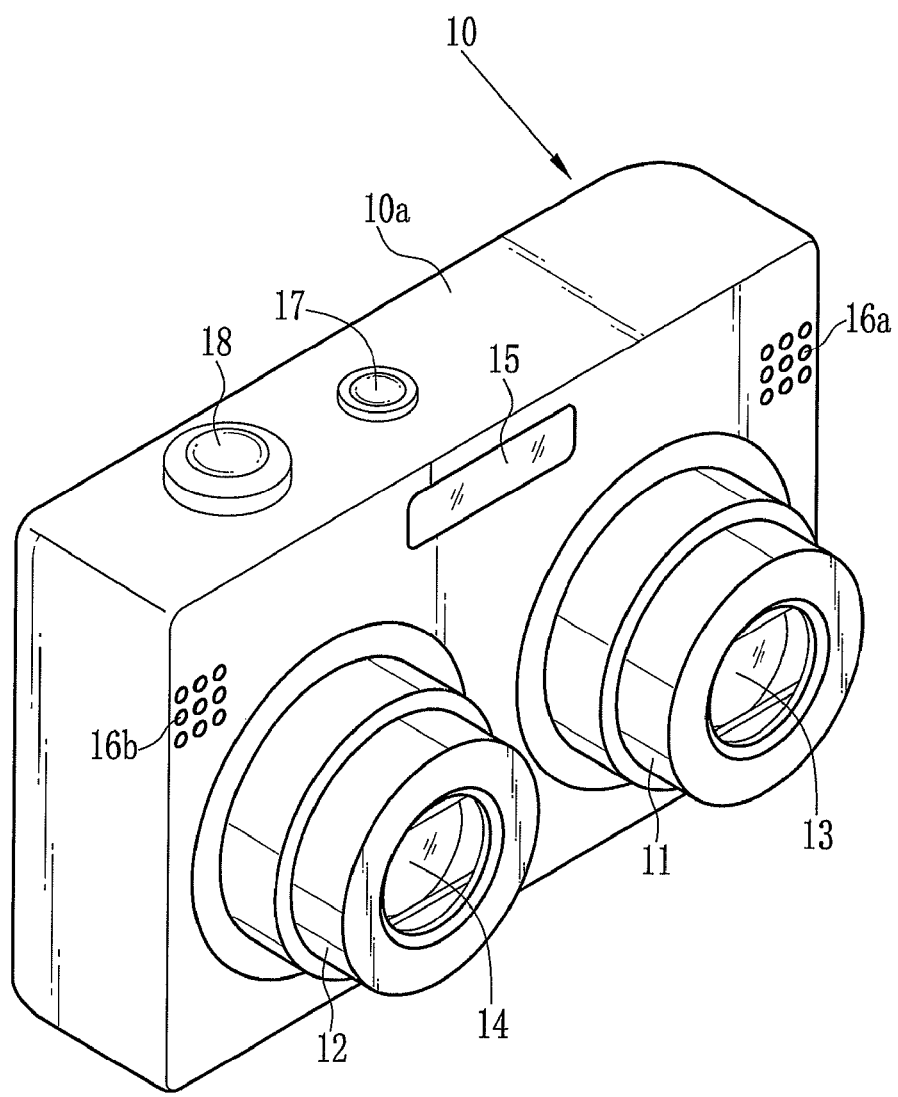
FIG. 1 is a front perspective view of a digital camera according to the present invention.

As shown in FIG. 1, a digital camera 10 is provided with a left lens barrel 11 and a right lens barrel 12 on a front face. The left lens barrel 11 contains an imaging optical system 13, and the right lens barrel 12 contains an imaging optical system 14. The left and right lens barrels 11 and 12 retract into a camera body 10a upon turning off the digital camera 10, and protrude from the front face of the camera body 10a to take a still image or a motion image. The imaging optical system 13 includes a varifocal lens 13a and a focus lens 13b, and the imaging optical system 14 includes a varifocal lens 14a and a focus lens 14b (see FIG. 4).

In the front face of the camera body 10a, there are provided an electronic flash 15 at an upper middle part, left sound inlet holes 16a near a left end, and right sound inlet holes 16b near a right end. The electronic flash 15 applies flash light to an object under control of a CPU 50 (see FIG. 3). Behind the left and right sound inlet holes 16a and 16b, a left microphone 66 and a right microphone 67 (see FIG. 3) are disposed, respectively. A power button 17, a shutter release button 18, and the like are provided on a top face of the camera body 10a.

The digital camera 10 has a still mode for taking the still image, a movie mode for taking the motion image, and a reproduction mode for reproducing and displaying the photographed still and motion images. In the still mode, upon pushing the shutter release button 18 halfway down, the digital camera 10 makes exposure preparation including focusing and exposure adjustment. Then, the still image is captured in response to fully pushing the shutter release button 18. In the movie mode, the digital camera 10 starts photographing the motion image in response to the full push of the shutter release button 18, and ends photographing upon cancellation of the full push.

Figure 2:
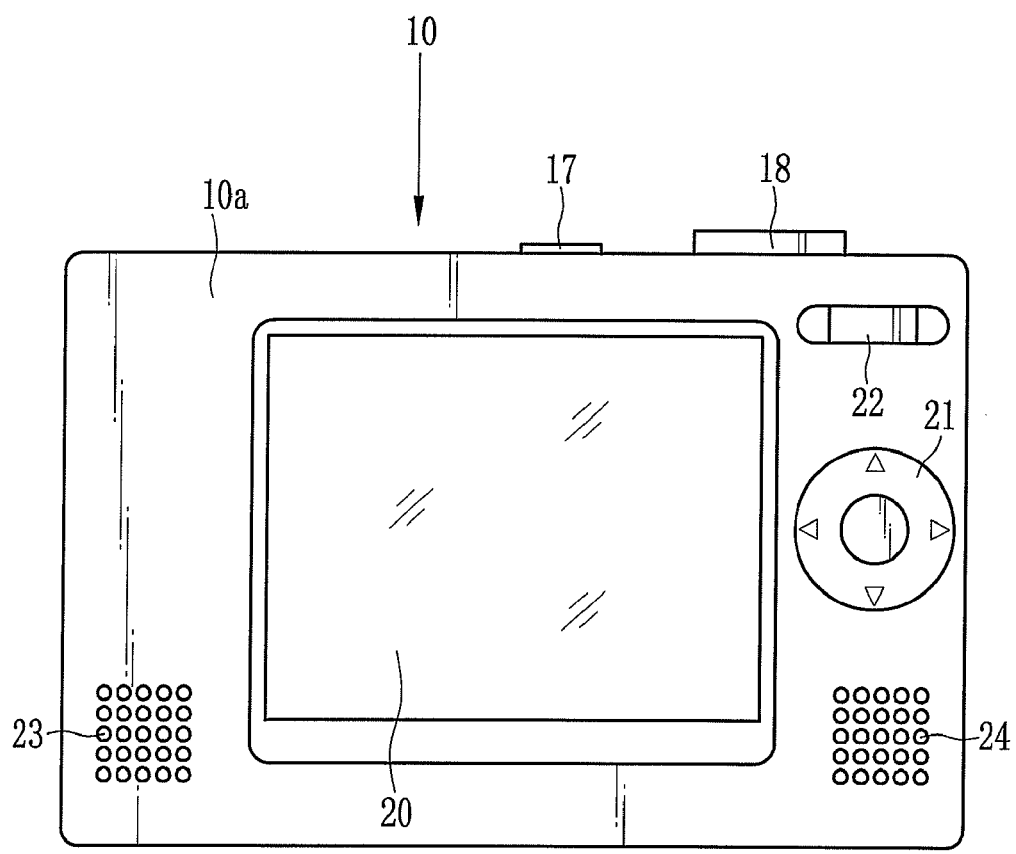
FIG. 2 is a rear plan view of the digital camera.

On a rear face of the camera body 10a, as shown in FIG. 2, there are provided an LCD 20 for displaying the photographed still and motion images and various setting items, a menu key 21 for switching the setting items, the displayed still and motion images, and the camera modes, and a zoom button 22. In response to operation of the zoom button 22, the varifocal lenses 13a and 14a are shifted to zoom in or out on the object, in addition to rescaling the image. A not-illustrated lenticular lens for stereoscopy is attached to a front face of the LCD 20.

The rear face of the camera body 10a is provided with left speaker holes 23 for emitting sound outputted from a left speaker 81 (see FIG. 3) to the outside, and right speaker holes 24 for emitting sound outputted from a right speaker 82 (see FIG. 3) to the outside. The left speaker holes 23 are disposed at the left side from the LCD 20, and the right speaker holes 24 are disposed at the right side from the LCD 20.

Figure 3:
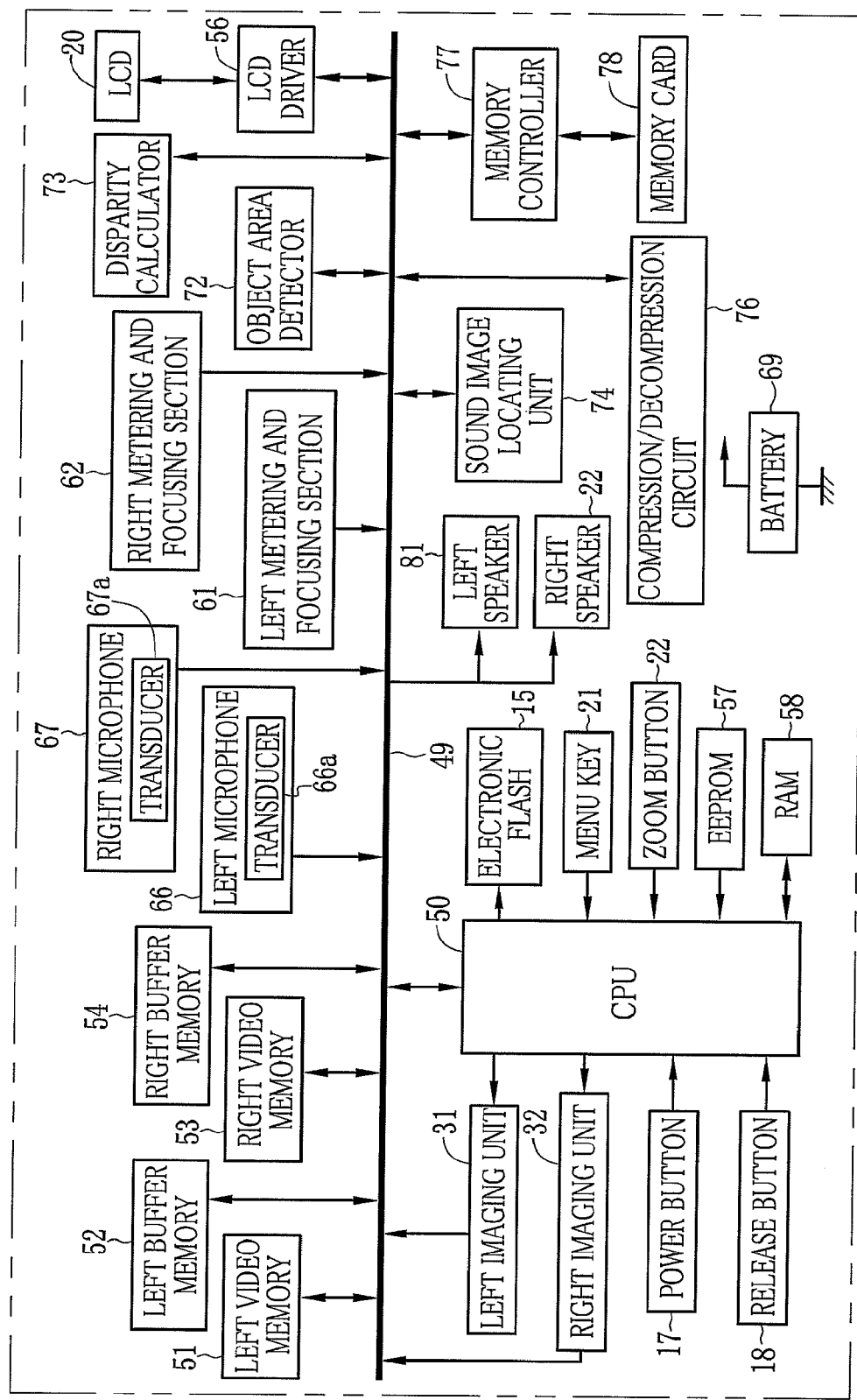
FIG. 3 is a block diagram showing the electrical structure of the digital camera.
Figure 4:
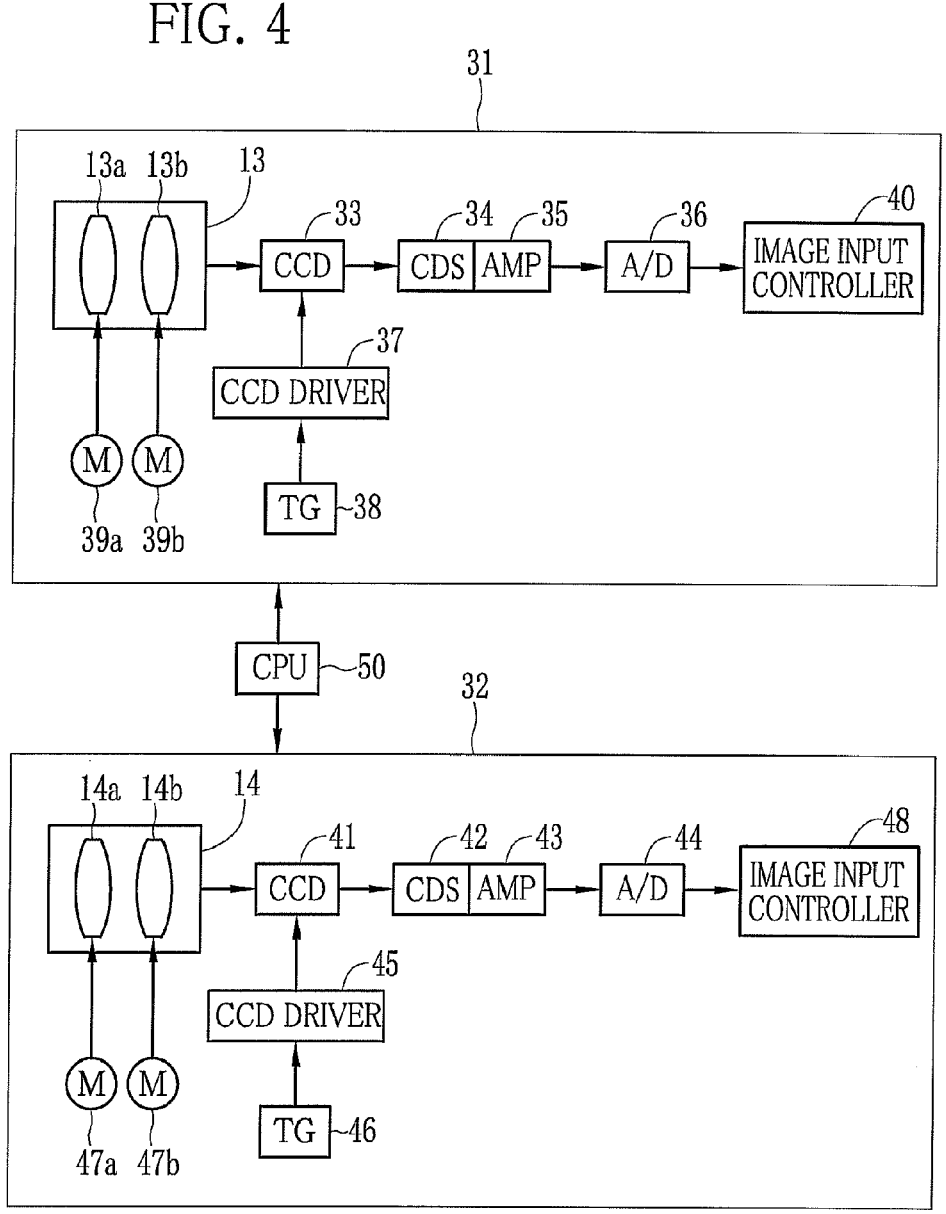
FIG. 4 is a block diagram of a left imaging unit and a right imaging unit.

As shown in FIG. 3, the digital camera 10 is provided with a left imaging unit 31 for capturing a left (L) viewpoint image and a right imaging unit 32 for capturing a right (R) viewpoint image. As shown in FIG. 4, the left imaging unit 31 includes the imaging optical system 13 and a CCD 33 disposed behind the imaging optical system 13. The CCD 33 is driven by a CCD driver 37 based on a timing clock signal from a timing generator (TG) 38, which the CPU 50 controls. Object light that has passed through the imaging optical system 13 is incident upon the CCD 33. The CCD 33 photoelectrically converts the object light into R, G, and B signals for producing the L viewpoint image, and sends the R, G, and B signals to a correlated double sampling circuit (CDS) 34. The CDS 34 removes noise from the R, G, and B signals. The R, G, and B signals outputted from the CDS 34 are amplified by an amplifier (AMP) 35 in accordance with ISO sensitivity, and are converted by an analog-to-digital converter (A/D) 36 into L viewpoint image data. A zoom motor 39a and a focus motor 39b, which the CPU 50 drives via not-illustrated motor drivers, shift the varifocal lens 13a and the focus lens 13b to carry out zooming and focusing, respectively.

An image input controller 40 is connected to the CPU 50 via a data bus 49 (see FIG. 3), and controls the CDS 34, the AMP 35, and the A/D 36 based on commands from the CPU 50. To the CPU 50, there is connected an EEPROM 57 that stores various control programs and setting data. The CPU 50 controls individual parts based on the programs of the EEPROM 57. A reference numeral 58 denotes a RAM. A reference numeral 69 denotes a battery for supplying electric power to individual circuits.

As with the left imaging unit 31, the right imaging unit 32 including the imaging optical system 14, a CCD 41, a CDS 42, an AMP 43, an A/D 44, a CCD driver 45, a TG 46, a zoom motor 47a, a focus motor 47b, and an image input controller 48, is operated by the CPU 50. The right imaging unit 32 produces R viewpoint image data.

The image input controller 40 of the left imaging unit 31 writes the L viewpoint image data to a left video memory 51 or a left buffer memory 52. The image input controller 48 of the right imaging unit 32, in a like manner, writes the R viewpoint image data to a right video memory 53 or a right buffer memory 54.

To display of a live view, the L and R viewpoint image data of low resolution is produced and temporarily stored in the left and right video memories 51 and 53, respectively. The L and R viewpoint image data of low resolution is sent to an LCD driver 56 via the data bus 49, and is displayed as the live view on the LCD 20. In the left and right buffer memories 52 and 54, on the other hand, the L and R viewpoint image data of high resolution is temporarily stored. In this embodiment, the L viewpoint image data of twenty frames and the R viewpoint image data of twenty frames on a per-second basis is successively written to the left and right buffer memories 52 and 54, respectively, in the movie mode.

To reproduce the motion image in the reproduction mode, the LCD driver 56 outputs stereo images to the LCD 20. In each stereo image, the L viewpoint image and the R viewpoint image are alternately arranged into horizontal stripes. With use of the lenticular lens disposed in front of the LCD 20, the L viewpoint image is seen by a left eye of a viewer, and the R viewpoint image is seen by a right eye of the viewer, so that the viewer sees the stereo image.

A left metering and focusing section 61 determines an exposure amount and a white balance correction value from a measurement result of object brightness captured by the left imaging unit 31. The left metering and focusing section 61 also determines an in-focus position of the focus lens 13b from image contrast. A right metering and focusing section 62 does the same.

The left and right metering and focusing sections 61 and 62 operate in predetermined cycles during display of the live view. While the live view is displayed, an aperture stop opening (not-illustrated) is controlled based on the exposure amount determined by each of the left and right metering and focusing sections 61 and 62, and focusing is obtained.

In response to the half push of the shutter release button 18 in the still mode or the full push of the shutter release button 18 in the movie mode, the left and right metering and focusing sections 61 and 62 measure the object brightness in output of the CCDs 33 and 41, respectively. The left and right metering and focusing sections 61 and 62 check the contrast of images formed on the CCDs 33 and 41 while shifting the focus lenses 13b and 14b, and set the focus lenses 13b and 14b in positions where the contrast becomes maximum. Focus distances of the left and right imaging units 31 and 32 can be calculated from the positions of the focus lenses 13b and 14b, respectively. The CPU 50 controls charge accumulation time (shutter speed) of the CCDs 33 and 41 and actuation of the electronic flash 15.

The left and right microphones 66 and 67 have transducers 66a and 67a, respectively, for producing sound data (electric signals). The left and right microphones 66 and 67 receive ambient sound, and convert the received sound into raw sound data in the movie mode. The left and right microphones 66 and 67 produce the raw sound data in synchronization with the obtainment of the L and R viewpoint image data.

Figure 6A:
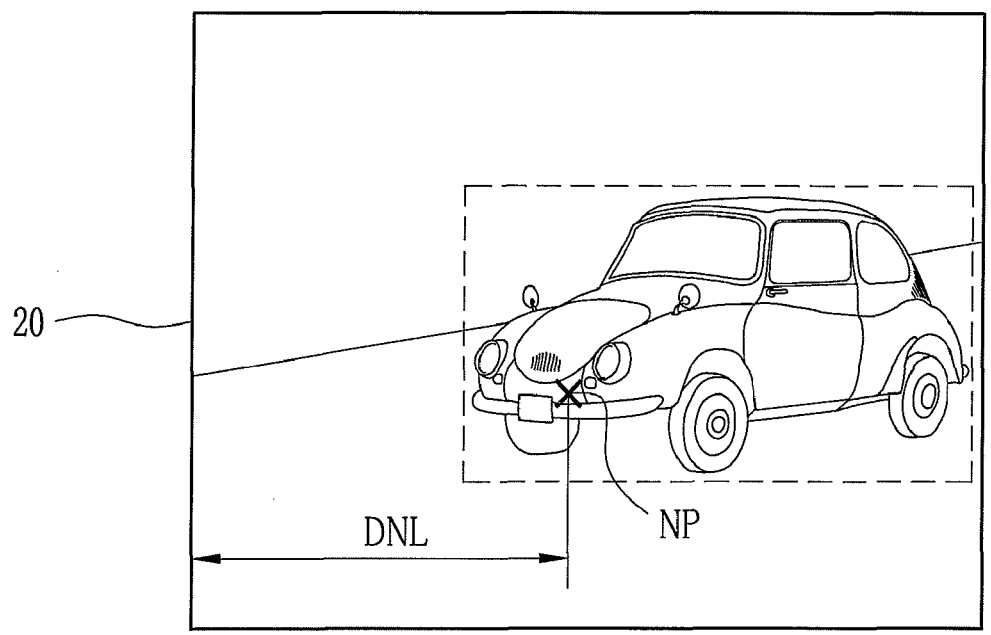
FIG. 6A is an explanatory view of a left (L) viewpoint image displayed on an LCD.
Figure 6B:
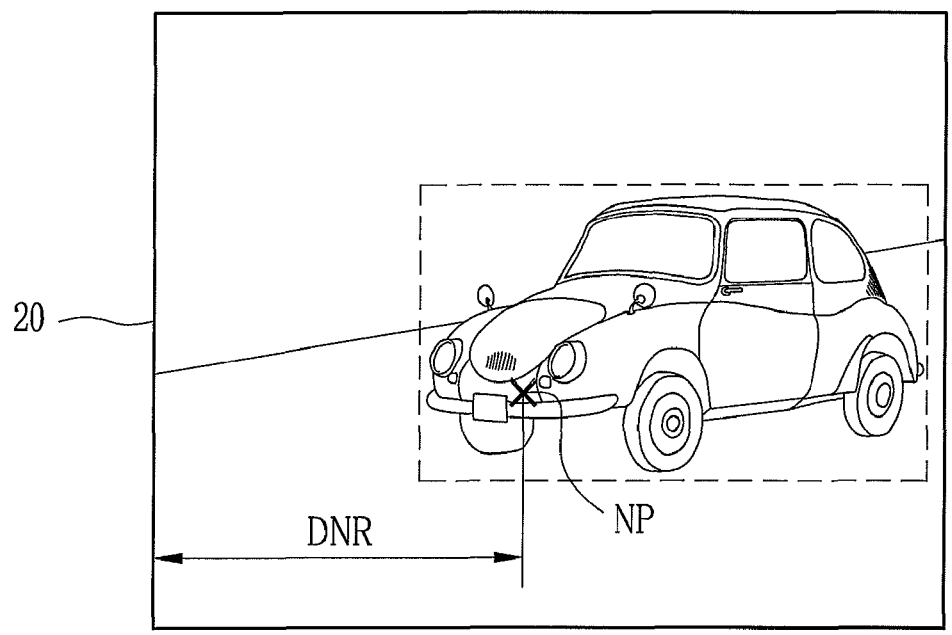
FIG. 6B is an explanatory view of a right (R) viewpoint image displayed on the LCD.

In the movie mode, an object area detector 72 reads the L viewpoint image data from the left buffer memory 52, and reads the R viewpoint image data from the right buffer memory 54. The object area detector 72 detects an object area (area surrounded by dotted lines in FIG. 6A or 6B) from each of the L viewpoint image shown in FIG. 6A and the R viewpoint image shown in FIG. 6B, and calculates the size of the object area. The object area detector 72 detects the object by a well-known pattern recognition technique, a color recognition technique, or the like. The object area detector 72 calculates an average of the sizes of the object areas detected from the L and R viewpoint images, and outputs the average as an object size. Whenever the L and R viewpoint image data is newly obtained, the object area detector 72 detects the object area in each image. If the image has a plurality of objects, the object area detector 72 may detect the object area of a main object that is in sharp focus.

A disparity calculator 73, as is widely known, calculates a disparity between the L and R viewpoint images at each point in the object area detected by the object area detector 72. First, the same image (the same point) is extracted from the object area of each of the L and R viewpoint images. Then, a distance between a left edge of a screen and the extracted point is measured in each of the L and R viewpoint images. The difference between the two distances obtained from the L and R viewpoint images is referred to as the disparity. From a plurality of points in the object area having various disparities obtained in this manner, the point of the maximum disparity is referred to as a nearest point NP. This nearest point NP is a point that looks nearest to the viewer, and is marked with a cross in each of FIGS. 6A and 6B. The disparity (maximum disparity) at the nearest point NP is expressed by DNL-DNR, wherein DNL represents the distance between the left edge of the screen and the nearest point NP in the L viewpoint image, and DNR represents the distance therebetween in the R viewpoint image.

Figure 5:
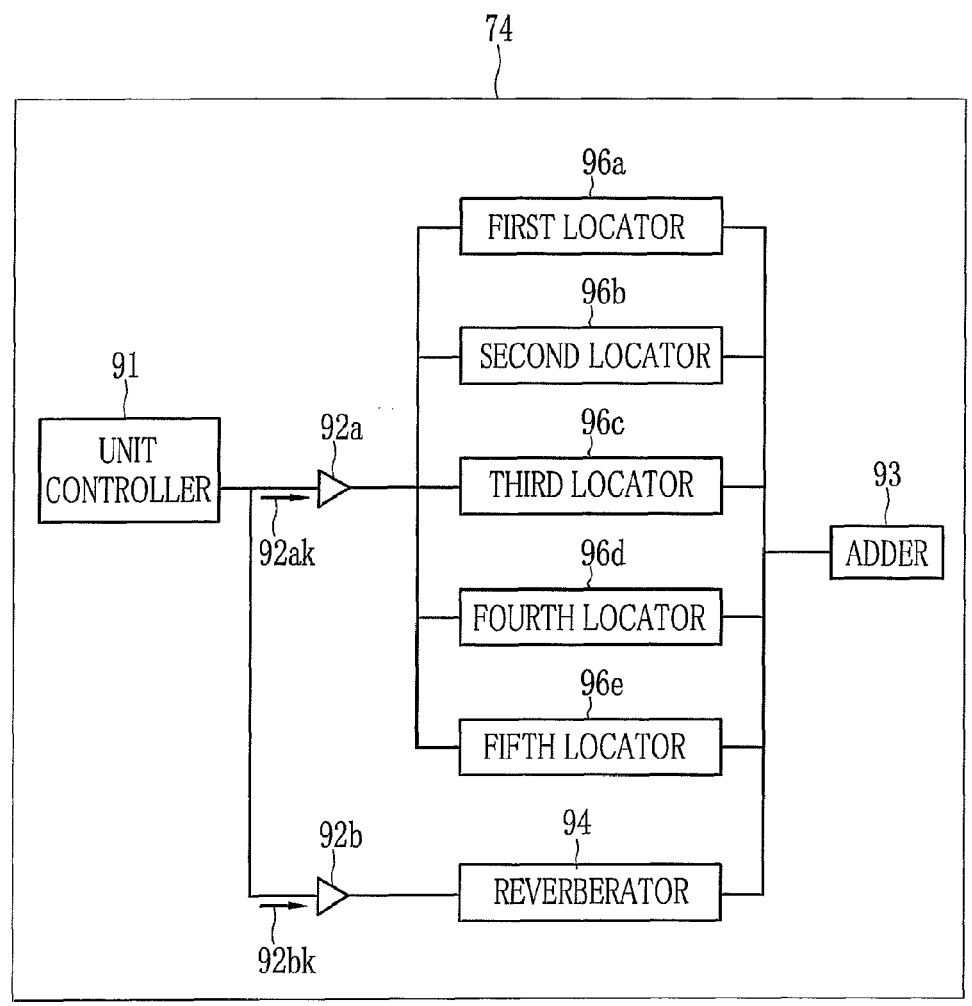
FIG. 5 is a block diagram of a sound image locating unit.

As shown in FIG. 5, a sound image locating unit 74 is constituted of a unit controller 91, multipliers 92a and 92b for dividing the raw sound data produced by the left and right microphones 66 and 67 in accordance with a predetermined ratio, an adder 93, and a reverberator 94. The adder 93 includes two adder circuits for an L-channel and an R-channel. In this embodiment, the sound image locating unit 74 locates a sound image on the condition that the viewer exists in the middle of the left and right speakers 81 and 82 and at a predetermined distance (for example, 50 cm) away from the rear face of the camera body 10a.

The multipliers 92a and 92b multiply the raw sound data by multiplication coefficients 92ak and 92bk, respectively, which are inputted from the unit controller 91. The multiplication coefficients 92ak and 92bk are so determined that the sum total of the multiplication coefficients 92ak and 92bk becomes one, and the raw sound data is divided into first sound data and second sound data according to the multiplication coefficients 92ak and 92bk.

The reverberator 94 produces reverberation sound data from the second sound data outputted from the multiplier 92b, and inputs the reverberation sound data to the adder 93. If the ratio (hereinafter called reverberation sound ratio) of the second sound data to the first sound data is low, the sound image of composite sound is located on a front side, and hence the viewer perceives as if the sound emerged from a near sound source. If the reverberation sound ratio is high, the sound image is located on a back side, and hence the viewer perceives as if the sound emerged from a distant sound source.

The unit controller 91 (sound image locator) determines an increasing or decreasing percentage of the reverberation sound ratio as a shift amount from a standard ratio set in advance, on the basis of the object size detected by the object area detector 72 and the maximum disparity obtained in the object area by the disparity calculator 73. The standard ratio is stored in advance on the EEPROM 57.

The unit controller 91 determines the shift amount of the reverberation sound ratio from the standard ratio, with checking the object size against predetermined first and second threshold values, and checking the maximum disparity against a predetermined disparity threshold value. These threshold values are stored in advance on the EEPROM 57, and are appropriately changeable.

Figure 7A:
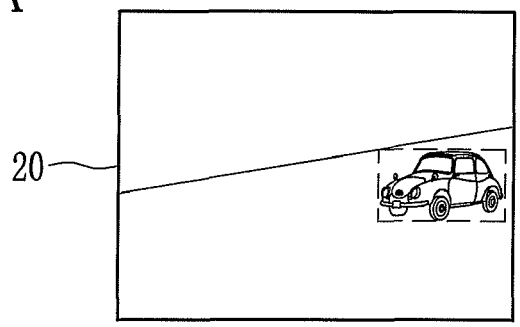
FIGS. 7A to 7D are explanatory views of four images in which the size of a main object differs from one another.
Figure 7B:
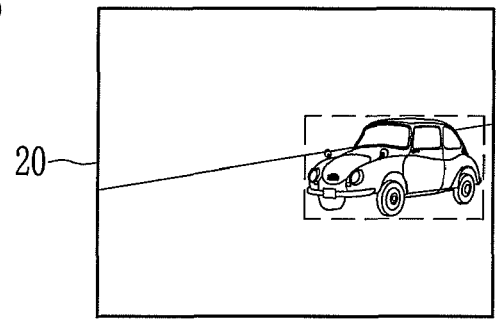

If the object size is less than the first threshold value and the maximum disparity is less than the disparity threshold value, as shown in FIG. 7A, the unit controller 91 determines the shift amount of the reverberation sound ratio at 0%, so that the standard ratio is used without any change. If the object size is the first threshold value or more and less than the second threshold value, and the maximum disparity is less than the disparity threshold value, as shown in FIG. 7B, the unit controller 91 determines the shift amount of the reverberation sound ratio at 0%.

Figure 7C:
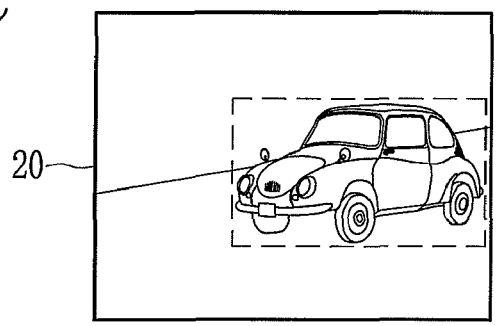

If the object size is the first threshold value or more and less than the second threshold value, and the maximum disparity is the disparity threshold value or more, as shown in FIG. 7C, the unit controller 91 determines the shift amount of the reverberation sound ratio at −5%.

Figure 7D:
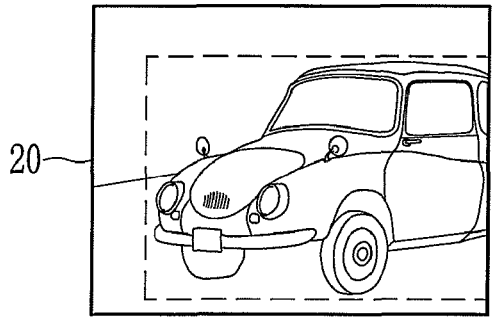

If the object size is the second threshold value or more, as shown in FIG. 7D, the unit controller 91 determines the shift amount of the reverberation sound ratio at −10%. In this case, the maximum disparity should be equal to or more than the disparity threshold value.

The unit controller 91 determines the multiplication coefficients 92ak and 92bk based on the shift amount of the reverberation sound ratio determined as described above.

A plurality of head-related transfer functions, each of which is determined in accordance with a location angle, are stored in the EEPROM 57. To obtain the head-related transfer function, a dummy head, which resembles a human's head in shape and has microphones attached to positions of right and left ears, is prepared to detect a waveform that a sound emitted from a sound source horizontally 50 cm away from the dummy head forms on the microphones. Then, the difference between an original waveform and the waveform detected on the microphones is obtained. This detection is carried out a number of times with changing the position of the sound source in space. To be more specific, the distance between the left and right speakers 81 and 82 is evenly divided into five, i.e. first to fifth sections from left. The detection is carried out with the sound source being disposed in the position corresponding to the first section. From the difference between the original waveform and the detected waveform, a function (first head-related transfer function) is obtained. This first head-related transfer function can convert the original waveform into the waveform that the sound emitted from the sound source positioned in the first section forms on the ears of the viewer. Then, the detection is carried out with the sound source being disposed in a position corresponding to the second section, and a second head-related transfer function is obtained. The second head-related transfer function can convert the original waveform into the waveform that the sound emitted from the sound source positioned in the second section forms on the ears of the viewer. In a like manner, the detection is carried out with changing the position of the sound source, and third to fifth head-related transfer functions are obtained.

As shown in FIG. 5, the sound image locating unit 74 is provided with first to fifth locators 96a to 96e. The first locator 96a corresponds to the first section, and the second locator 96b corresponds to the second section. The third to fifth locators 96c to 96e correspond to the third to fifth sections, respectively. The first to fifth locators 96a to 96e read the first to fifth head-related transfer functions from the EEPROM 57, and apply convolution operation to the first sound data inputted from the multiplier 92a based on the first to fifth head-related transfer function, respectively. Each of the first to fifth locators 96a to 96e is constituted of parallel-connected two FIR filters for the L-channel and the R-channel. The first sound data is processed by the FIR filter that corresponds to the position where the sound image is to be located. Upon reproducing the processed first sound data, the viewer perceives as if the sound emerged from the located position.

The number of the locators is appropriately changeable. For example, twelve locators may be provided correspondingly to twelve directions, into which 360° around the viewer is divided at intervals of 30°. This allows the sound image to be located not only on the front of the viewer but also on the side or back thereof.

The unit controller 91 horizontally divides each of the L and R viewpoint images into five sections. The unit controller 91 detects in which section a horizontal center of the object area exists, and chooses one of the first to fifth locators 96a to 96e according to the detected section. To the chosen locator, the first sound data is inputted through the multiplier 92a.

The chosen one of the locators 96a to 96e applies the convolution operation to the first sound data, and outputs the processed first sound data to the adder 93. The adder 93 adds the processed first sound data to the reverberation sound data outputted from the reverberator 94, and obtains composite sound data. In reproducing the motion image, the composite sound data is outputted from the left and right speakers 81 and 82.

A compression/decompression circuit 76 compresses or decompresses the L viewpoint image data, the R viewpoint image data, and the composite sound data into or from a well-known JPEG file.

Figure 8:
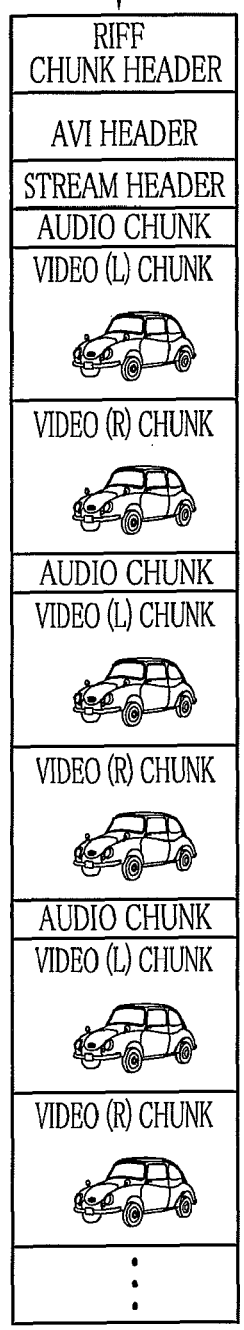
FIG. 8 is an explanatory view showing the structure of a first audiovisual file.

In the movie mode, a JPEG-format audiovisual (AV) file as shown in FIG. 8 is created. The AV file is composed of a RIFF chunk header required for compiling data of various formats including the image data and the sound data into a single file, an AVI header required for dealing with the motion image with the sound, a stream header, audio chunks, video (L) chunks, and video (R) chunks. The photographed motion image is written as the single AV file to a memory card 78 via a memory controller 77 (see FIG. 3).

The video (L) chunk contains the compressed L viewpoint image data of twenty frames (hereinafter called L viewpoint image stream), which composes one second of motion image. The video (R) chunk contains the compressed R viewpoint image data of twenty frames (called R viewpoint image stream). The audio chunk contains the compressed composite sound data of twenty frames (called audio stream).

The stream header contains, as information of each stream, the type of motion image, a reproduction time of the motion image, a data amount per chunk, a beginning address of each frame, a stream ID, a resolution, a compression scheme, the number of display dimensions, a frame number per chunk, photographing information, and the like.

Figure 9:
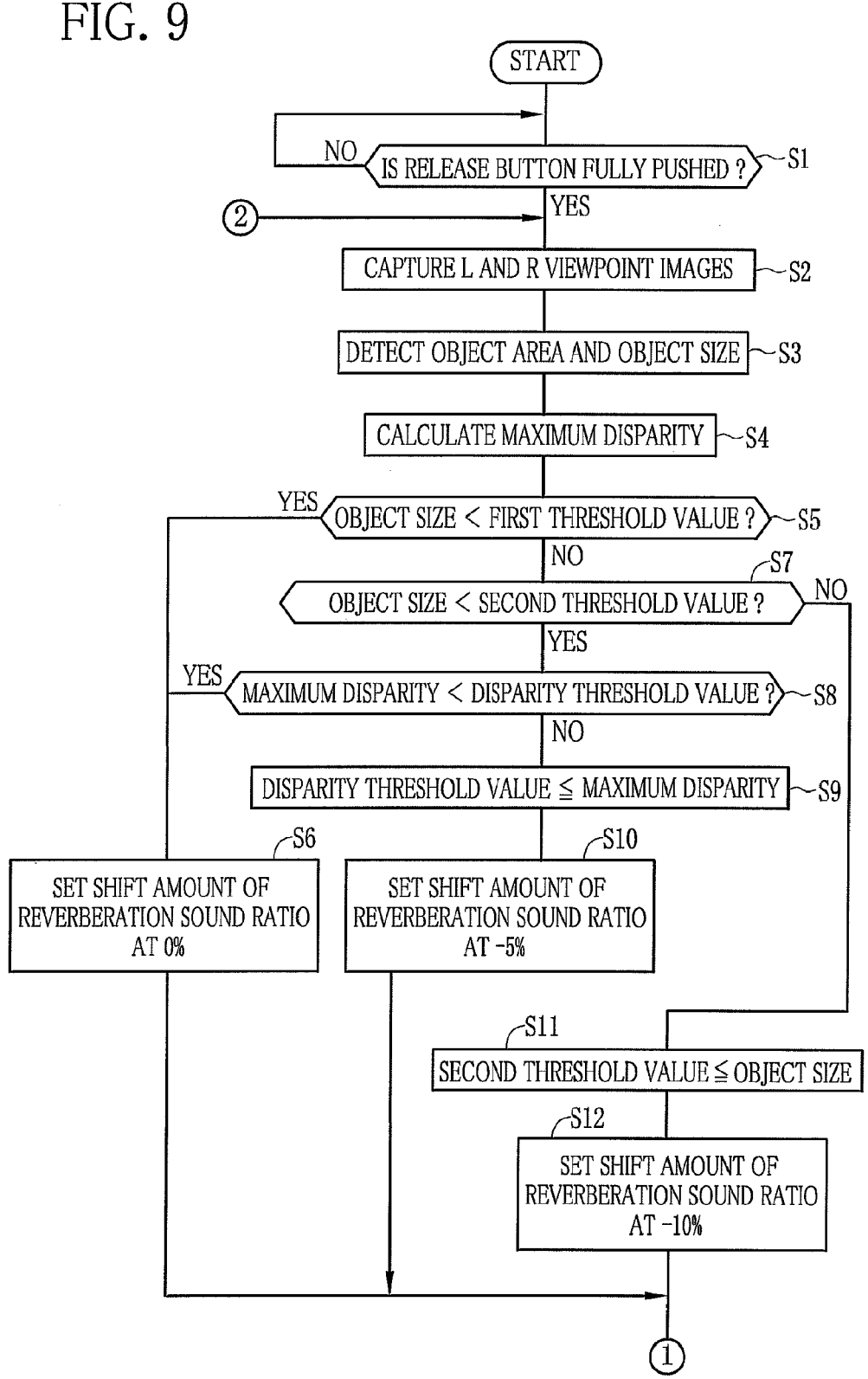
FIGS. 9 and 10 are flowcharts in a movie mode.
Figure 10:
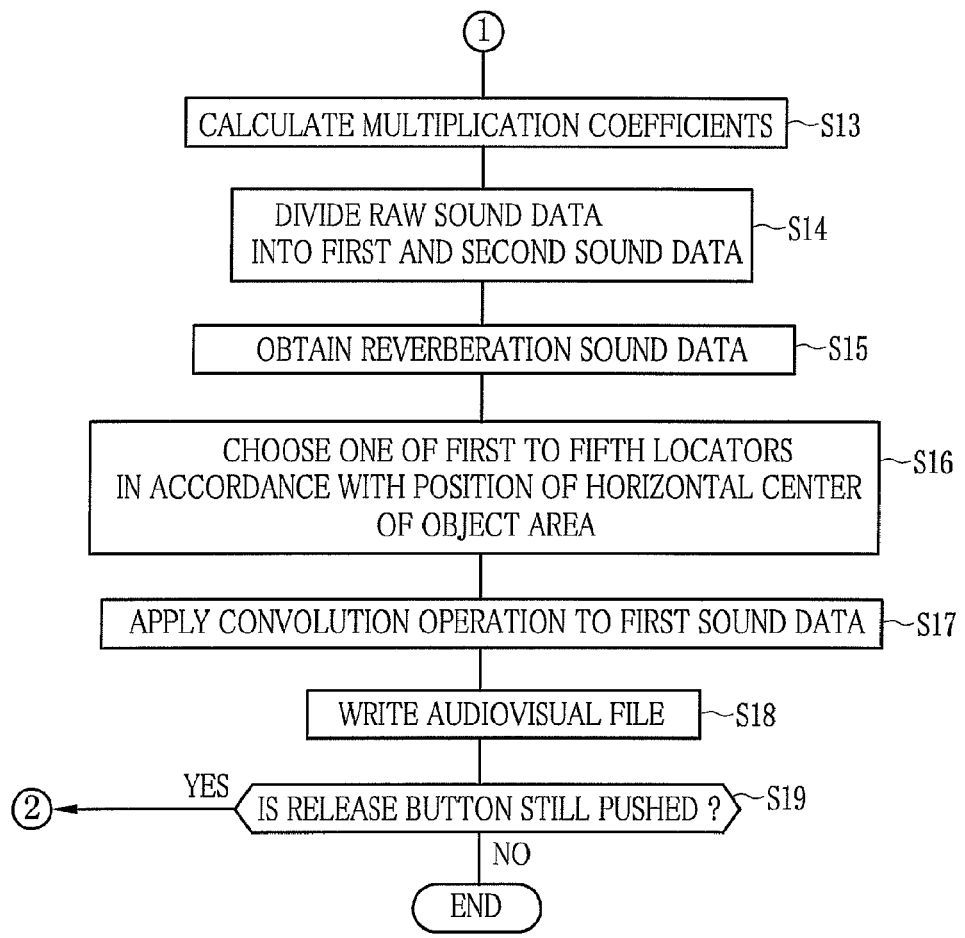

The operation of the digital camera 10 will be described with referring to flowcharts of FIGS. 9 and 10. Upon fully pushing the shutter release button 18 in the movie mode (YES in S1), as is widely known, the L viewpoint image data captured by the CCD 33 is written to the left buffer memory 52, and the R viewpoint image data is written to the right buffer memory 54 (S2).

The object area detector 72 reads the L and R viewpoint image data from the left and right buffer memories 52 and 54, respectively, and detects the object area and the object size from each of the L and R viewpoint images (S3). The disparity calculator 73 detects the nearest point NP that looks nearest to the viewer from each of the L and R viewpoint images, and calculates the distance DNL between the left edge and the nearest point NP in the L viewpoint image shown in FIG. 6A, and the distance DNR between the left edge and the nearest point NP in the R viewpoint image shown in FIG. 6B. The disparity calculator 73 subtracts the distance DNR from the distance DNL, to obtain the maximum disparity of a scene (S4).

In the sound image locating unit 74, the unit controller 91 judges whether or not the object size is less than the first threshold value (S5). If YES in S5, the shift amount of the reverberation sound ratio from the standard ratio is determined at 0% (S6).

If NO in S5, on the other hand, the unit controller 91 judges whether or not the object size is the first threshold value or more and less than the second threshold value (S7). If YES in S7, the unit controller 91 continuously judges whether or not the maximum disparity is less than the disparity threshold value (S8). If YES in S7 and YES in S8, the shift amount of the reverberation sound ratio from the standard ratio is determined at 0% (S6). In this case, the standard ratio is used as the reverberation sound ratio.

YES in S7 and NO in S8 mean that the maximum disparity is disparity threshold value or more (S9). In this case, the shift amount of the reverberation sound ratio is determined at −5% (S10). The reverberation sound ratio is decreased from the standard ratio by 5%, so that the sound image is located on the front side as compared with the case of the standard ratio. Thus, the viewer perceives as if the sound was emitted from a near sound source.

NO in S7 means that the object size is the second threshold value or more (S11). In this case, the shift amount of the reverberation sound ratio is determined at −10% (S12). In this case, the reverberation sound ratio is decreased from the standard ratio by 10%, so that the sound image is localized on the more front side, as compared with the case of −5%. Thus, the viewer perceives as if the sound was emitted from a nearer sound source.

The unit controller 91 calculates the reverberation sound ratio from the determined shift amount, and calculates the multiplication coefficients 92ak and 92bk based on the calculated reverberation sound ratio (S13). Then, the unit controller 91 outputs the calculated multiplication coefficients 92ak and 92bk to the multipliers 92a and 92b. The multipliers 92a and 92b multiply the raw sound data by the multiplication coefficients 92ak and 92bk, respectively, to divide the raw sound data into the first and second sound data (S14).

The reverberator 94 produces the reverberation sound data from the second sound data inputted through the multiplier 92b (S15), and outputs the reverberation sound data to the adder 93.

The unit controller 91 horizontally divides the image into the five sections. The unit controller 91 detects in which section the horizontal center of the object area detected by the object area detector 72 exists, and chooses the single locator corresponding to the detected section from the first to fifth locators 96a to 96e (S16). If the horizontal center of the object area exists in the second section from left, for example, the second locator 96b is chosen. To the chosen second locator 96b, the first sound data is inputted through the multiplier 92a.

The second locator 96b reads the second head-related transfer function from the EEPROM 57. The second locator 96b applies the convolution operation to the first sound data based on the second head-related transfer function (S17), and outputs the processed first sound data to the adder 93. Accordingly, the sound image is located at an angle corresponding to the position of the object area.

The adder 93 adds the processed first sound data outputted from the second locator 96b to the reverberation sound data outputted from the reverberator 94, and obtains the composite sound data. The composite sound data, the L viewpoint image data read from the left buffer memory 52, and the R viewpoint image data read from the right buffer memory 54 are compressed by the compression/decompression circuit 76 into the JPEG-format AV file. The AV file is written to the memory card 78 via the memory controller 77 (S18).

While the shutter release button 18 is being pushed (YES in S19), steps from S2 to S18 are repeated. Upon releasing the push of the shutter release button 18 (NO in S19), the digital camera 10 ends photographing the motion image.

In the reproduction mode, if one of the AV files recorded on the memory card 78 is chosen by operation of the menu key 21, the chosen AV file is reproduced. During the reproduction, the compression/decompression circuit 76 decompresses the L and R viewpoint image data and the composite sound data contained in the AV file. From the decompressed L and R viewpoint image data, the stereo image is produced and displayed on the LCD 20. Continuously displaying a plurality of stereo images on the LCD 20 allows production of a stereo motion image.

The decompressed composite sound data is outputted from the left and right speakers 81 and 82 in synchronization with the display of the stereo images on the LCD 20. The sound image of the composite sound data is located in the front or rear side based on the object size and the maximum disparity, and has the location angle corresponding to the position of the object area in the image. Therefore, the sound can enhance a sense of realism and an impact of the scene of the stereo motion image.

Figure 11:
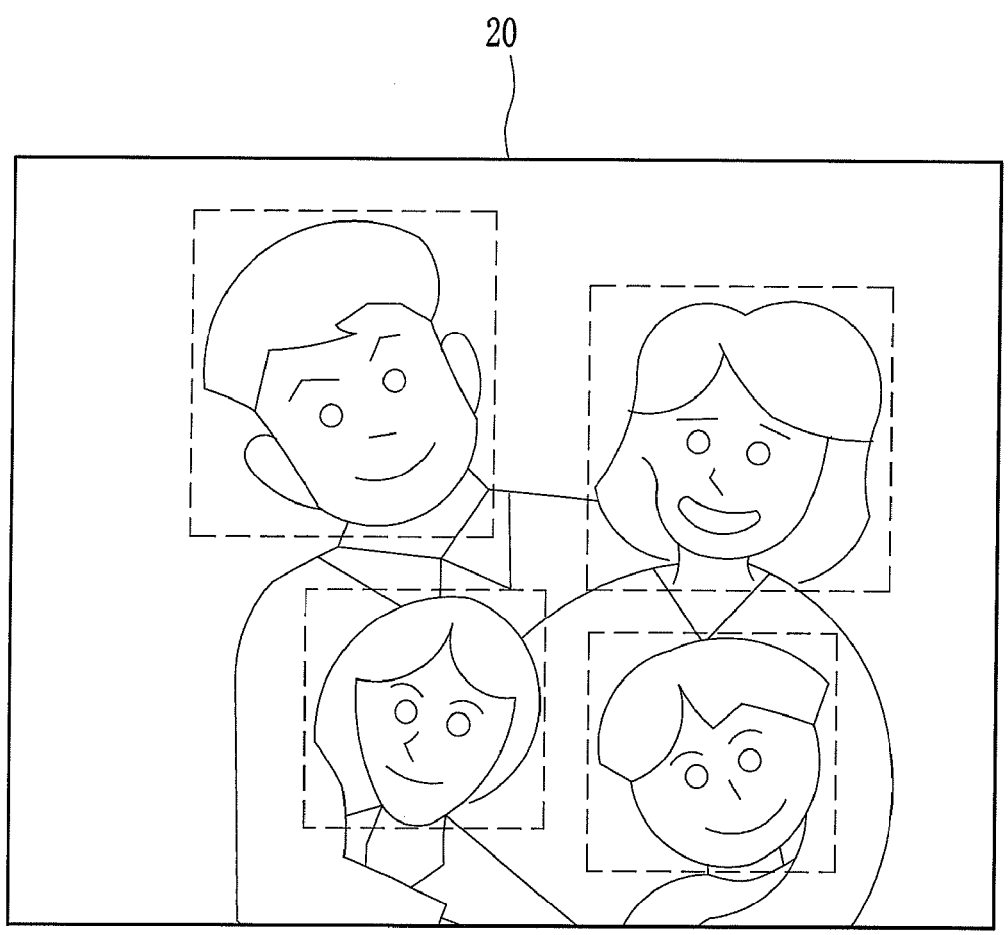
FIG. 11 is an explanatory view showing an example of an image including a plurality of main objects.

As shown in FIG. 11, if the image includes a plurality of object areas (four object areas surrounded by the dotted lines), the disparity calculator 73 calculates the maximum disparity in each of the four object areas. An average of the four maximum disparities is set as the maximum disparity of the image.

The disparity calculator 73 may obtain an average disparity, instead of the maximum disparity. The sound image locating unit 74 determines the shift amount of the reverberation sound ratio on the basis of the average disparity calculated by the disparity calculator 73 and the object size detected by the object area detector 72. To obtain the average disparity, a farthest point that looks farthest from the viewer is detected in each of the L and R viewpoint images. Then, the distance DFL between the left edge of the screen and the farthest point in the L viewpoint image, and the distance DFR between the left edge of the screen and the farthest point in the R viewpoint image are calculated. Subtraction of the distance DFR from the distance DFL provides a minimum disparity in a horizontal direction. Then, an average of the minimum disparity and the maximum disparity is calculated to obtain the average disparity.

A plurality of characteristic points may be extracted from the image, and a disparity may be calculated in each of the characteristic points. Furthermore, an average of the disparities of the characteristic points may be used as an average disparity of the image. Taking a person's face image as an example, the characteristic points include a nose tip, a tail and an inner corner of eyes, an end and a base of eyebrows, corners of mouth, and the like. In this case, the characteristic points are extracted concurrently with the detection of the object area.

Second Embodiment

Figures 12, 13:
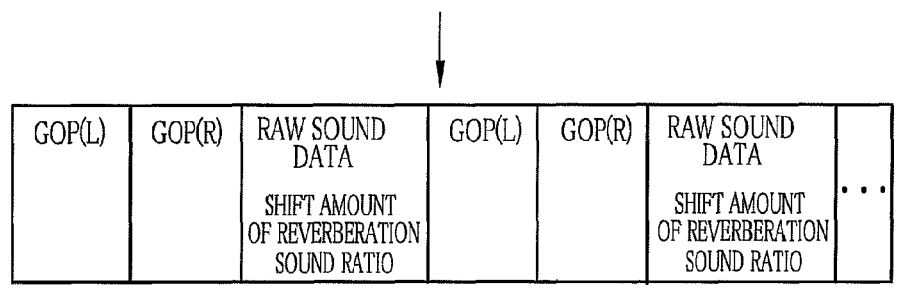
FIG. 12 is a shift amount determination table according to a second embodiment for determining the shift amount of a reverberation sound ratio based on a focus lens shift amount.
FIG. 13 is an explanatory view showing the structure of a second audiovisual file according to the second embodiment.

In a second embodiment as shown in FIGS. 12 and 13, the sound image locating unit 74 determines the shift amount of the reverberation sound ratio from the standard ratio in accordance with the object size and a lens shift amount of the focus lenses 13b and 14b. The same reference numerals as those of the first embodiment refer to the same or similar components, and the detailed description thereof will be omitted.

A not-illustrated lens shift amount measuring unit measures the lens shift amount of the focus lenses 13b and 14b in focusing. The lens shift amount relates to a subject distance. The sound image locating unit 74 determines the shift amount of the reverberation sound ratio from the standard ratio on the basis of the object size detected by the object area detector 72 and the lens shift amount obtained by the lens shift amount measuring unit.

A shift amount determination table as shown in FIG. 12 for determining the shift amount of the reverberation sound ratio is stored in advance on the EEPROM 57. The sound image locating unit 74 refers to the shift amount determination table to determine the shift amount of the reverberation sound ratio from the standard ratio. If the object size is a size threshold value or more, and the lens shift amount is a shift amount threshold value or more, for example, the shift amount of the reverberation sound ratio is determined at 0%. If the object size is the size threshold value or more, and the lens shift amount is less than the shift amount threshold value, the shift amount of the reverberation sound ratio is determined at −5%.

The compression/decompression circuit 76 compresses the photographed L and R viewpoint image data and the raw sound data into an MPEG-format AV file. In the MPEG-format AV file, a key frame (an L viewpoint image I-frame) and a delta frame including a P-frame (an L viewpoint image P-frame) and a B-frame (an L viewpoint image B-frame) are created from the L viewpoint image data of twenty frames (for one second). An R viewpoint image I-frame, an R viewpoint image P-frame, and an R viewpoint image B-frame are created from the R viewpoint image data of twenty frames (for one second).

As shown in FIG. 13, the AV file contains "Groups of Pictures (L)" (GOP(L)s), "Groups of Pictures (R)" (GOP(R)s), the compressed raw sound data of twenty frames, and the shift amounts of the reverberation sound ratio. In this embodiment, the raw sound data is recorded separately from the shift amount of the reverberation sound ratio. In addition, one of the first to fifth locators 96a to 96e may be chosen based on the position of the object area, and this chosen data may be recorded separately from the raw sound data and the shift amount of the reverberation sound ratio.

Each GOP (L) includes the L viewpoint image I-frame, the L viewpoint image P-frame, and the L viewpoint image B-frame. Each GOP(R) includes the R viewpoint image I-frame, the R viewpoint image P-frame, and the R viewpoint image B-frame.

To reproduce the AV file, the compression/decompression circuit 76 decompresses each frame and data in the MPEG-format. The L viewpoint image P-frame and the L viewpoint image B-frame are decoded with referring to the L viewpoint image I-frame. Likewise, the R viewpoint image P-frame and the R viewpoint image B-frame are decoded with referring to the R viewpoint image I-frame. Based on these frames, the stereo motion image is produced and displayed on the LCD 20. The decompressed raw sound data is processed by the sound image locating unit 74 into the composite sound data. The sound image of the composite sound data is located on the front or rear side based on the shift amount of the reverberation sound ratio, and has the location angle corresponding to the position of the object area. The composite sound data is outputted from the left and right speakers 81 and 82 in synchronization with the display of the stereo motion image on the LCD 20.

Figure 14:
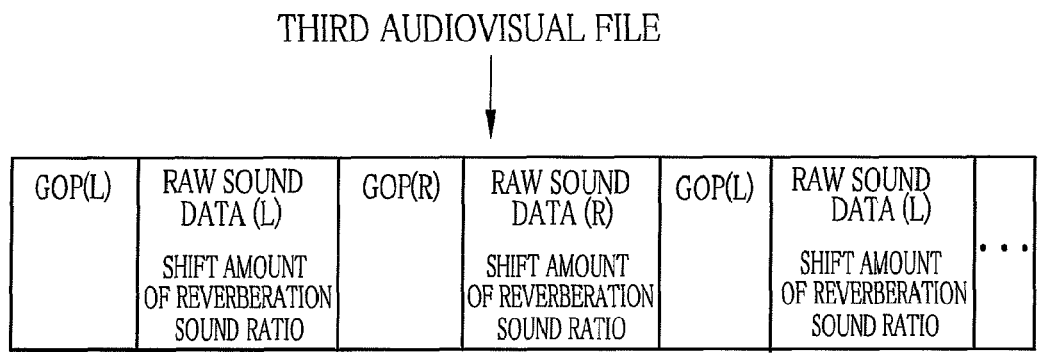
FIG. 14 is an explanatory view showing the structure of a third audiovisual file.

As shown in FIG. 14, raw sound data (L) and raw sound data (R) may be separately stored in an AV file. In this case, the raw sound data (L) includes L-channel raw sound data of twenty frames and the shift amount of the reverberation sound ratio. Likewise, the raw sound data (R) includes R-channel raw sound data of twenty frames and the shift amount of the reverberation sound ratio.

Third Embodiment

Figure 16:
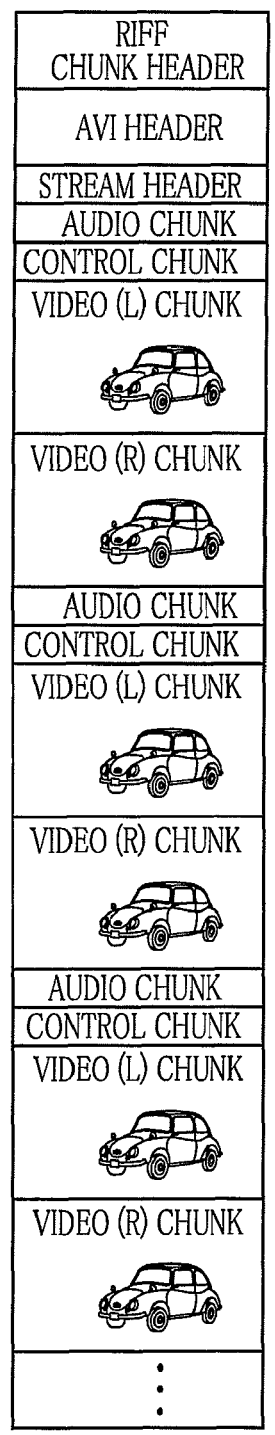
FIG. 16 is an explanatory view showing the structure of a fourth audiovisual file according to a third embodiment.

In a third embodiment as shown in FIGS. 15 and 16, the sound image locating unit 74 determines the shift amount of the reverberation sound ratio from the standard ratio, on the basis of the maximum disparity of the object area and the zoom position of the imaging optical systems 13 and 14. The same reference numerals as those of the first embodiment refer to the same or similar components, and the detailed description thereof will be omitted.

In this embodiment, each imaging optical system 13 or 14 has the ability to vary a focal length from 28 mm (wide-angle shot) to 300 mm (telephoto shot) in 35 mm film format. The disparity calculator 73 obtains the maximum disparity of the object area, and the zoom position of the imaging optical systems 13 and 14. To be more specific, the disparity calculator 73 determines the zoom position of the imaging optical systems 13 and 14 among a wide-angle position, a standard position, and a telephoto position. If the focal length is less than 40 mm, for example, the zoom position is determined to be the wide-angle position. If the focal length is between or equal to 40 mm and 120 mm, the zoom position is determined to be the standard position. If the focal length is more than 120 mm, the zoom position is determined to be the telephoto position.

The sound image locating unit 74 determines the shift amount of the reverberation sound ratio from the maximum disparity and the zoom position obtained by the disparity calculator 73.

A shift amount determination table of the reverberation sound ratio as shown in FIG. 15 is stored in advance on the EEPROM 57. The sound image locating unit 74 determines the shift amount of the reverberation sound ratio with referring to this table. For example, if the maximum disparity is a first threshold value or more and less than a second threshold value, and the zoom position is the standard position, the shift amount of the reverberation sound ratio is determined at −2%. If the maximum disparity is the second threshold value or more, and the zoom position is the wide-angle position, the shift amount of the reverberation sound ratio is determined at −10%.

The compression/decompression circuit 76 compresses the L and R viewpoint image data and the raw sound data into a JPEG-format AV file. This AV file, as shown in FIG. 16, is composed of a RIFF chunk header, an AVI header, a stream header, audio chunks, control chunks, video (L) chunks, and video (R) chunks.

Each audio chunk includes the compressed raw sound data of twenty frames (one second). The control chunk includes data on the shift amounts of the reverberation sound ratio of the twenty frames. One of the first to fifth locator 96a to 96e may be chosen in advance based on the position of the object area, and this choice data may be recorded in the control chunk separately from the shift amounts of the reverberation sound ratio.

To reproduce the AV file, the compression/decompression circuit 76 decompresses the JPEG-format AV file, and the stereo motion image is displayed on the LCD 20. The sound image locating unit 74 processes the decompressed raw sound data into the composite sound data, in which the sound image is located on the front or rear side based on the shift amount of the reverberation sound ratio, and has the location angle corresponding to the position of the object area. The composite sound data is outputted from the left and right speakers 81 and 82 in synchronization with the display of the stereo motion image on the LCD 20.

In the above embodiments, the reverberation sound ratio is varied to locate the sound image on the front or rear side, but sound volume, phase difference of the sound data (sound signals), a sound pressure level ratio, or the like may be varied instead or in addition.

To locate the sound image on the front or rear side, a reverberation sound may be outputted with delay by an appropriate delay time in comparison with a direct sound.

In the above embodiments, the sound image locating unit 74 locates the sound image on condition that the viewer is 50 cm away from the rear face of the camera body 10a, but the distance between the viewer and the digital camera 10 is appropriately changeable. As the distance between the viewer and the digital camera 10, a plurality of distances including 50 cm, 1 m, and 1.5 m are adoptable. In this case, a plurality of head-related transfer functions corresponding to individual distances are obtained in advance, and the viewer may choose the distance with the menu key 21 or the like. The sound image locating unit 74 locates the sound image with use of the head-related transfer function corresponding to the chosen distance.

In the above embodiments, the sound is outputted from the left and right speakers 81 and 82, but may be outputted from headphones connected via a connection terminal.

The digital camera 10 may have three or more imaging optical systems, instead of the two imaging optical systems 13 and 14 for capturing the L and R viewpoint images.

An audiovisual data recording device and method according to the present invention are applicable to not only a digital camera, but also a camera-equipped cellular phone or an image recording system including a plurality of video cameras, speakers, a personal computer, and the like.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An audiovisual data recording device for recording a stereo motion image with a sound, comprising:
  a plurality of imaging units for capturing one set of viewpoint images for composing the stereo motion image at a predetermined time interval, each of the imaging units having an imaging optical system and an image sensor;
  a plurality of microphones for capturing raw sound data during the capture of the viewpoint images;
  an object area detector for detecting a main object area in each of the viewpoint images, the main object area containing a main object;
  an information obtaining section for obtaining disparity information whenever the one set of viewpoint images is captured;
  a determining section for determining where to locate a sound image as sound image location information, based on the main object area detected by the object area detector and the disparity information obtained by the information obtaining section;

a recorder for recording on a recording medium the raw sound data and the sound image location information, or processed sound data with the located sound image, together with data of the viewpoint images; and a sound image locating unit for converting the raw sound data captured by the microphones into the processed sound data based on the sound image location information, if the processed sound data is recorded on the recording medium, wherein the sound image locating unit locates the sound image in a depth direction by varying a ratio between a direct sound and a reverberation sound.

2. The audiovisual data recording device according to claim 1, wherein the one set of viewpoint images includes a left viewpoint image and a right viewpoint image;

the plurality of imaging units include a left imaging unit for capturing the left viewpoint image and a right imaging unit for capturing the right viewpoint image; and the plurality of microphones include a left microphone related to the left imaging unit and a right microphone related to the right imaging unit.

3. The audiovisual data recording device according to claim 2, wherein the disparity information includes at least one of a maximum disparity or an average disparity in the one set of viewpoint images and a maximum disparity or an average disparity in the main object.

4. The audiovisual data recording device according to claim 1, wherein the sound image locating unit locates the sound image in a horizontal direction by a convolution operation with a head-related transfer function.

5. The audiovisual data recording device according to claim 1, further comprising a display for displaying the stereo motion image and a speaker for converting the processed sound data into the sound.

6. The audiovisual data recording device according to claim 1, wherein the information obtaining section further obtains focus adjustment information of the imaging optical system whenever the one set of viewpoint images is captured, and wherein the determining section determines where to locate the sound image in accordance with a position and a size of the main object area and a position of a focus lens in each of the imaging optical systems.

7. The audiovisual data recording device according to claim 1, wherein the information obtaining section further obtains zoom magnification information of the imaging optical system whenever the one set of viewpoint images is captured, and wherein the determining section determines where to locate the sound image in accordance with a position and a size of the main object area and a zoom magnification of each of the imaging optical systems.

8. A method for recording an audiovisual data containing a stereo motion image with a sound, comprising the steps of:

capturing by a plurality of imaging units one set of viewpoint images for composing the stereo motion image at a predetermined time interval, each of the imaging units having an imaging optical system and an image sensor;

capturing by a plurality of microphones raw sound data during the capture of the viewpoint images;

detecting a main object area in each of the viewpoint images, the main object area containing a main object;

obtaining disparity information whenever the one set of viewpoint images is captured;

determining where to locate a sound image as sound image location information, based on the main object area and the disparity information;

recording on a recording medium the raw sound data and the sound image location information, or processed sound data with the located sound image, together with data of the viewpoint images;

converting the raw sound data captured by the microphones into the processed sound data based on the sound image location information, if the processed sound data is recorded on the recording medium; and locating the sound image in a depth direction by varying a ratio between a direct sound and a reverberation sound.

9. The method for recording the audiovisual data according to claim 8, wherein the one set of viewpoint images includes a left viewpoint image and a right viewpoint image;

the plurality of imaging units include a left imaging unit for capturing the left viewpoint image and a right imaging unit for capturing the right viewpoint image; and the plurality of microphones include a left microphone related to the left imaging unit and a right microphone related to the right imaging unit.

10. The method for recording the audiovisual data according to claim 9, wherein the disparity information includes at least one of a maximum disparity or an average disparity in the one set of viewpoint images and a maximum disparity or an average disparity in the main object.

* * * * *